(12) United States Patent
Zhu

(10) Patent No.: US 9,164,230 B2
(45) Date of Patent: Oct. 20, 2015

(54) HIGH-POWER DOUBLE-CLADDING-PUMPED (DC) ERBIUM-DOPED FIBER AMPLIFIER (EDFA)

(71) Applicant: OFS Fitel, LLC, Norcross, GA (US)

(72) Inventor: Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/010,622

(22) Filed: Aug. 27, 2013

(65) Prior Publication Data

US 2014/0268311 A1  Sep. 18, 2014

Related U.S. Application Data

(60) Provisional application No. 61/802,086, filed on Mar. 15, 2013.

(51) Int. Cl.
| | |
|---|---|
| *H01S 3/067* | (2006.01) |
| *G02B 6/036* | (2006.01) |
| *G02B 6/02* | (2006.01) |
| *H01S 3/094* | (2006.01) |
| *H01S 3/16* | (2006.01) |
| *H01S 3/0941* | (2006.01) |

(52) U.S. Cl.
CPC ........ *G02B 6/036* (2013.01); *G02B 6/02* (2013.01); *H01S 3/0677* (2013.01); *H01S 3/06729* (2013.01); *H01S 3/06733* (2013.01); *H01S 3/094007* (2013.01); *H01S 3/1608* (2013.01); *H01S 3/06704* (2013.01); *H01S 3/09415* (2013.01); *H01S 3/094011* (2013.01); *H01S 3/094069* (2013.01); *H01S 3/1693* (2013.01)

(58) Field of Classification Search
CPC ............. G02B 6/02019; G02B 6/0365; G02B 6/03672; H01S 3/0677; H01S 3/1608; H01S 3/094007
USPC ............................................ 359/341.1, 341.3
See application file for complete search history.

(56) References Cited

U.S. PATENT DOCUMENTS

| | | | | |
|---|---|---|---|---|
| 4,852,968 | A * | 8/1989 | Reed | 385/127 |
| 5,059,230 | A * | 10/1991 | Mollenauer et al. | 65/390 |
| 2002/0159736 | A1 * | 10/2002 | Dejneka et al. | 385/127 |
| 2004/0036955 | A1 * | 2/2004 | Digonnet et al. | 359/341.1 |
| 2009/0034059 | A1 * | 2/2009 | Fini | 359/341.3 |
| 2009/0123120 | A1 * | 5/2009 | Dragic | 385/123 |
| 2010/0178504 | A1 * | 7/2010 | Chen et al. | 428/391 |
| 2010/0284659 | A1 * | 11/2010 | Nicholson et al. | 385/127 |
| 2011/0081123 | A1 * | 4/2011 | Pare et al. | 385/124 |
| 2014/0063594 | A1 * | 3/2014 | Herstrom et al. | 359/341.5 |
| 2014/0212103 | A1 * | 7/2014 | Taunay | 385/127 |

* cited by examiner

*Primary Examiner* — Eric Bolda
(74) *Attorney, Agent, or Firm* — Sam S. Han, Esq.

(57) ABSTRACT

A high-powered double cladding (DC) pumped Ytterbium-free L-band Erbium doped fiber amplifier (EDFA) for dense-wavelength-division multiplexing (DWDM) is disclosed. The DC pumped Ytterbium-free L-band EDFA comprises a length of DC Erbium-doped fiber (EDF) that has a low-index, large-diameter core. For some embodiments, the DC-EDF also comprises a trench that is located radially exterior to the cladding, thereby increasing cladding absorption while still effectively maintaining single-mode behavior.

13 Claims, 6 Drawing Sheets

| fiber parameters | typical values |
|---|---|
| core diameter (um) | 13 |
| core NA | 0.11 |
| core n | 0.0041 |
| inner clad diameter (um) | 105 |
| inner clad NA | >0.18 |
| inner clad n | 0.012 |
| OD (um) | 125 |
| peak abs (dB/m) | 25 |
| cutoff ( m) | 1.52 |
| inner clad shape | star | ns # HIGH-POWER DOUBLE-CLADDING-PUMPED (DC) ERBIUM-DOPED FIBER AMPLIFIER (EDFA)

CROSS-REFERENCE TO RELATED APPLICATIONS

This application claims the benefit of U.S. provisional patent application Ser. No. 61/802,086, filed 2013 Mar. 15, having the title "High-Power Double-Cladding-Pumped (DC) Erbium-Doped Fiber Amplifier (EDFA)," by Zhu, which is incorporated herein by reference in its entirety.

BACKGROUND

1. Field of Disclosure

The present disclosure relates generally to optical amplifiers, and, more specifically, to double-cladding pumped erbium-doped fiber amplifiers (EDFA).

2. Description of Related Art

Demand for increased data capacity has resulted in the creation of next-generation optical networks. These next-generation optical networks use high-power amplifiers for efficient operation. Thus, there are ongoing efforts to improve the amplifiers for use in these next-generation optical telecommunication systems.

SUMMARY

A high-powered double cladding (DC) pumped Ytterbium-free L-band Erbium doped fiber amplifier (EDFA) for dense-wavelength-division multiplexing (DWDM) is disclosed. The DC pumped Ytterbium-free L-band EDFA comprises a length of DC Erbium-doped fiber (EDF) that has a low-index, large-diameter core. For some embodiments, the DC-EDF also comprises a trench that is located radially exterior to the cladding, thereby increasing cladding absorption while still effectively maintaining single-mode behavior.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
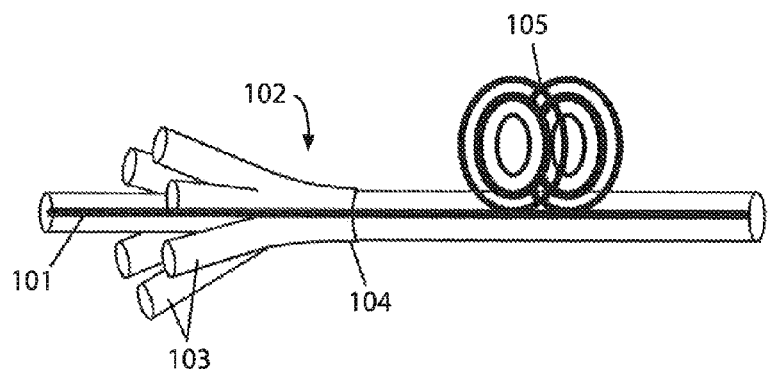
FIG. 1 is a diagram showing one embodiment of a double-cladding-pumped (DC) Erbium-doped fiber amplifier (EDFA) using a signal/pump multiplexer with a tapered fiber bundle.

Recently, there has been an increasing demand for high-power broadband optical amplifiers for use in next-generation optical telecommunication network applications. Examples of these network applications include unrepeatered submarine systems, reconfigurable optical add-drop multiplexers (ROADM) in meshed networks, etc. Demand for high-power optical amplifiers exists because optical signal-to-noise-ratio (OSNR) can be improved by increasing launched power in dense wavelength-division multiplexed (DWDM) transmission systems as a result of use of ultra-large-area transmission fibers.

Some of applications of these next-generation optical transmission systems require an output saturated power of at least approximately 25 dBm. In some instances the output saturated power demand is at least approximately 30 dBm. For example, this high output saturated power is required in a long haul meshed network in order to compensate for additional losses within ROADM devices.

Current output saturated power of either C-band or L-band Erbium-doped fiber amplifiers (EDFA) using a conventional core-pumping scheme is limited to approximately 23 dBm. The output saturated power is limited by a conventional core-pumping scheme as a result of various undesirable nonlinear effects, such as excited-state absorption (ESA) and Erbium-ion concentration quenching, which results in reduced power conversion efficiency (PCE). ESA generated by 980 nm pumping of a core limits the power conversion efficiency at high powers due to high pump intensity in a small core. High gain-doping densities, such as with Erbium (Er), can lead to pair induced quenching and ESA, which result in reduced output saturated power and PCE.

Additionally, current high power L-band EDFAs, when a core-pumping scheme is utilized, are susceptible to four-wave mixing (FWM) due to a small core diameter. Four-wave mixing can be especially deleterious in systems utilizing dense wavelength division multiplexing (DWDM) to increase transmission capacity. In such contexts, four-wave mixing leads to interfering cross-talk between different wavelengths and/or distortion of the gain spectrum. Further, the adverse effects of four-wave mixing can accumulate along the length of the fiber.

Double cladding (DC) pumping is used as an alternative to core-pumping for high power amplification using low cost multimode pump diodes. Despite the advantages from the use of DC pumping in telecommunication applications, significant difficulties still exist with a DC pumping amplifier design as a result of low pump light absorption. Additionally, low pump light absorption may lead to a need to increase fiber length.

To improve pump light absorption in DC pumped systems, co-doping of Er with Ytterbium (Yb) and phosphorous (P) is sometimes used. However, co-doping with P modifies Er cross-spectra and adversely affects WDM signals at short wavelengths. Moreover, P-doping reduces choice of other co-dopants, such as Aluminum (Al), due to its impact on refractive index value and variation in inner cladding. In short, P-co-doping schemes implemented to resolve issues associated with low pump absorption in DC pumped amplifiers modifies the gain spectrum, thus reducing the gain in a short wavelength range of WDM systems. For desirable wide gain spectrum flatness in WDM systems, a zero-concentration of P is desired. This typically requires the fiber to be essentially Yb-free and, instead, be co-doped with Al to achieve a broad gain spectrum of amplification and good gain flatness.

Other design techniques have been implemented to improve pump absorption in a DC pumped amplifier. Specifically, a pump absorption coefficient of a DC fiber is inversely proportional to a ratio of an inner-cladding area to a core area. Thus, reducing an inner cladding diameter increases pump absorption. Although this technique can lead to improved pump absorption, it is not without disadvantages. For example, reducing the inner cladding area typically requires specially designed multimode pump diodes packaged with smaller diameter pigtail fibers, which results in low power conversion efficiency. Theoretically, an improved pump absorption coefficient may also be achieved by increasing the core diameter. However, this may lead to significant disadvantages such as multimode operation or excessive bend losses, which are both undesirable for some applications including telecommunication applications.

From this, one having ordinary skill will appreciate that another key issue to consider in optical amplifier design for telecommunication applications is to maximize fiber core diameter while maintaining single-mode operation. In order to obtain single-mode operation, a core refractive-index (assuming step index profile) and core diameter typically satisfies a single-mode fiber criterion defined by:

$$\pi NA_{core} d_{core}/\lambda < V_c \quad [EQ. 1],$$

where $\lambda$ is an operating wavelength, $NA_{core}$ is a numerical aperture (NA) of the core, $d_{core}$ is the core diameter and $V_c$ is a cutoff frequency. For a step-index fiber, $V_c$ is 2.405. NA is related to the core refractive-index as:

$$NA = ((n^2_{core}) - (n^2_{inner\_clad}))^{1/2} \quad [EQ. 2],$$

where $n_{core}$ is the core refractive-index and $n_{inner\_clad}$ is an inner cladding refractive index. From EQ. 1 and EQ. 2, one can see that a lower NA of the core is normally needed for a larger core diameter with a fixed cutoff wavelength in order to maintain single-mode operation. In other words, decreasing the NA of the core compensates for an increased core size with a fixed or low cutoff wavelength, thus maintaining single-mode function.

Additionally, while increasing a gain-dopant concentration, may improve pump absorption efficiency, this method is also limited in its ability to improve pump absorption because increasing the gain-dopant results in a parabolic effect on pump absorption efficiency. At high dopant densities, the negative nonlinear effects of ESA and pair induced quenching result in decreased pump efficiencies. Therefore, arbitrarily increasing the amount of gain-dopant is not a suitable design solution for increasing pump absorption in a DC fiber amplifier.

As shown in FIG. 1, a tapered fiber bundle 102 may be used to couple multimode pump light and signal light in a DC EDFA design (FIG. 1). A signal light is launched into a single mode fiber 101 and multiplexed with pump light introduced through pigtail fibers 103. The tapered fiber bundle is then spliced 104 with a DC EDF 105. The external cladding of the double clad fiber is typically made of a low index soft polymer in order to increase the NA of the inner cladding, thereby obtaining high multimode throughput and/or high pump coupling efficiency. However, poor mechanical properties, concerns related to aging performance, and limited values for use in packaged signal-pump multiplexers make polymer coatings undesirable for use in telecommunication applications. Hence, an all-silica fiber composition is also a consideration in the design of an optical amplifier for telecommunication applications.

In sum, an EDFA's performance is a function of the overall effects of gain-dopant(s) concentration(s), dopant type, and waveguide properties of the fiber. One of ordinary skill will appreciate that the aforementioned parameters are intimately related to one another resulting in complex trade-offs between design parameters and EDFA function. Hence, one having ordinary skill in the art will realize that designing a practical high-powered DC pumped EDFA for WDM applications is not trivial in view of other DC pumped EDFA designs. The various embodiments of the disclosed high-powered DC pumped EDFA are designed with at least these competing interests in mind.

The several embodiments of the DC Yb-free L-band EDFA disclosed herein seek to maximize core diameter, while minimizing core refractive index so as to maintain single mode operation while increasing pump conversion efficiency and improving power output. In one embodiment, the DC Yb-free L-band EDFA, comprises a length of DC Yb-free Erbium-doped fiber (EDF), co-doped with Al, having core with a core diameter of approximately 19 microns and a NA of approximately 0.11, and an inner cladding with a diameter of approximately 105 mm and a NA of approximately 0.18. The embodiments disclosed herein have several advantages compared to conventional L-band EDFAs, including lower non-linearity and increased power output. In another embodiment, core area is increased by a low-index trench, which surrounds the core.

Having generally described several embodiments of a high power DC pumped Yb-free L-band EDFA, reference is now made in detail to the description of the embodiments as illustrated in the drawings. While several embodiments are described in connection with these drawings, there is no intent to limit the disclosure to the embodiment or embodiments disclosed herein. Rather, the intent is to cover all alternatives, modifications, and equivalents.

Double Cladding (DC) Pumped Erbium-Doped Fiber Amplifier (EDFA)

Figure 2:
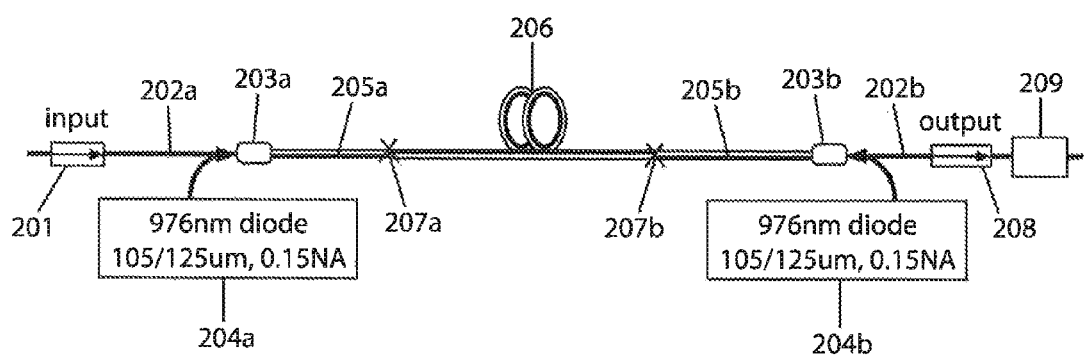
FIG. 2 is a diagram showing one embodiment of a high-power DC Ytterbium (Yb)-free L-band EDFA.

FIG. 2 is a diagram showing one embodiment of a high power DC pumped Yb-free L-band EDFA. Signal light 201a is launched into a first single mode fiber 202a and is multiplexed in a first optical multiplexer 203a. In one embodiment, pump light from a first multimode pump source 204a is multiplexed in the first optical multiplexer 203a and pumped into an inner cladding of the passive DC fiber 205a. In another embodiment, pump light from a second pump source 204b is multiplexed in a second optical multiplexer 203b and pumped into an inner cladding of a passive DC fiber 205b. In yet further embodiments, pump light from both the first pump source 204a and the second pump source 204b are used to pump the cladding of the passive DC fibers 205a and 205b.

The passive DC fiber 205a is core- and cladding-match spliced 207a to one end of a DC EDF 206. In some embodiments, the passive DC fiber 205a is tapered such that the fiber parameters at one end of the passive DC fiber 205a allow for core- and cladding-match splicing to the DC EDF 206. After being propagated along the DC EDF 206, pump light from a pump source 204a and 204b is transmitted along the inner-cladding of DC EDF, where the pump light is absorbed by the rare-earth dopant. This results in stimulated emission and, thus amplification gain of the signal. An irregular shape, such as a star shape as shown in FIG. 3, of the inner-cladding increases interaction of pump light and signal along the core, which improves the pump light absorption. The multiplexed signal and the pump light are transmitted along a second segment of passive DC fiber 205b spliced 207b at the other end of the DC EDF 206. In embodiments where the signal and pump light from a first pump source 204a are multiplexed in the first optical multiplexer 203a, after being propagated along the DC EDF 206, the multiplexed signal and the pump light are transmitted along a second segment of passive DC fiber 205b spliced 207b at the other end of the DC EDF 206. For some embodiments, a second multiplexer 203b may be used to counter-pump the DC EDF 206. An output signal 208 is then propagated along a second single mode fiber 202b and passed. In embodiments where the pump light from the second pump source 204b is multiplexed in a second optical multiplexer 203b and pumped into an inner cladding of a passive DC fiber 205b, the pump and signal are demultiplexed at the first signal/pump multiplexer 203a. For all embodiments, the output signal 208 is then propagated along a second single mode fiber 202b. In some embodiments, the output signal 208 is passed through a gain flattening filter (GFF) 209. For some embodiments, the system may also include optical isolators at the input and the output.

Figure 3A:
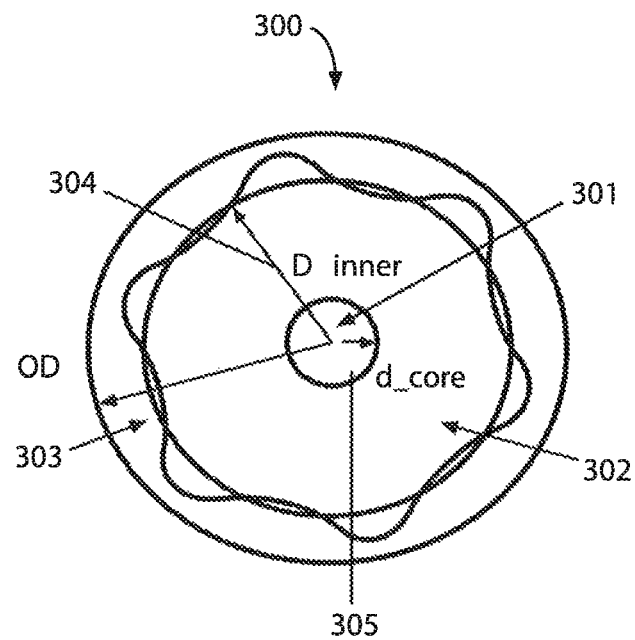
FIG. 3A is a diagram showing one embodiment of a cross-section of a Yb-free DC-Erbium-doped fiber (EDF).

FIG. 3A is a diagram showing one embodiment of a cross-section of a Yb-free DC-Erbium-doped fiber (EDF) 300. In the preferred embodiment, the core 301 is co-doped with Al. For other embodiments, additional co-dopants such as Germanium (Ge), Fluorine (Fl), etc., or any combination of these dopants are used. For all embodiments, there is substantially no doping with Yb. This design limitation results requires a relatively high core peak pump light absorption by increasing the relative Er concentration, thus allowing for sufficient absorption of pump light without significantly inducing pair induced quenching or excited-state absorption (ESA). The Er-doped core 301 is surrounded by a lower index inner cladding 302, and the lower index inner cladding 302 is surrounded by an even lower-index outer-cladding 303 (e.g., a soft polymer, air, low index glass, or other suitable material).

Figure 3B:
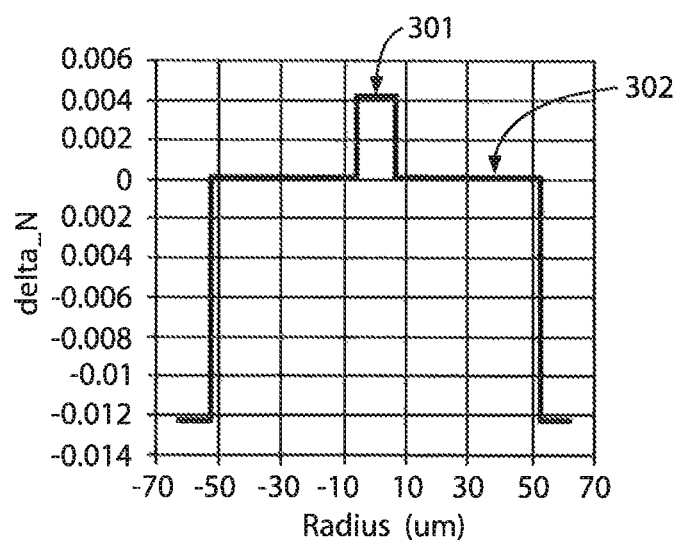
FIG. 3B is a diagram showing a refractive index profile of the DC-EDF of FIG. 3A.

FIG. 3B is a diagram showing a refractive index profile of the DC pumped EDF of FIG. 3A. Multimode pump light is guided by the inner cladding 302. Signal light, which is usually single-mode, is guided by the core 301. The light from one or more pump sources is transmitted along the inner cladding 302 of the fiber 300. As the pump light crosses or overlaps with the core 301, it is absorbed by the rare-earth dopant, and stimulated emission is generated in the core 301, thereby resulting in amplification gain of the signal in the core 301. The DC design disclosed herein allows for the use of low cost high-power 980 nm multimode pump sources 204a, 204b (collectively 204) (FIG. 2). In addition to being commercially available, use of the 980 nm multimode pump sources 204 reduces electrical serial resistance compared to single-mode pump laser sources. This gives the disclosed EDFA designs the advantage of significant energy savings over conventional single-mode core pumping EDFA designs. It is expected that a noise figure would be around about 5 dB to about 8 dB, which is sufficient to function as power booster amplifiers in WDM transmission systems.

Figures 4, 5:
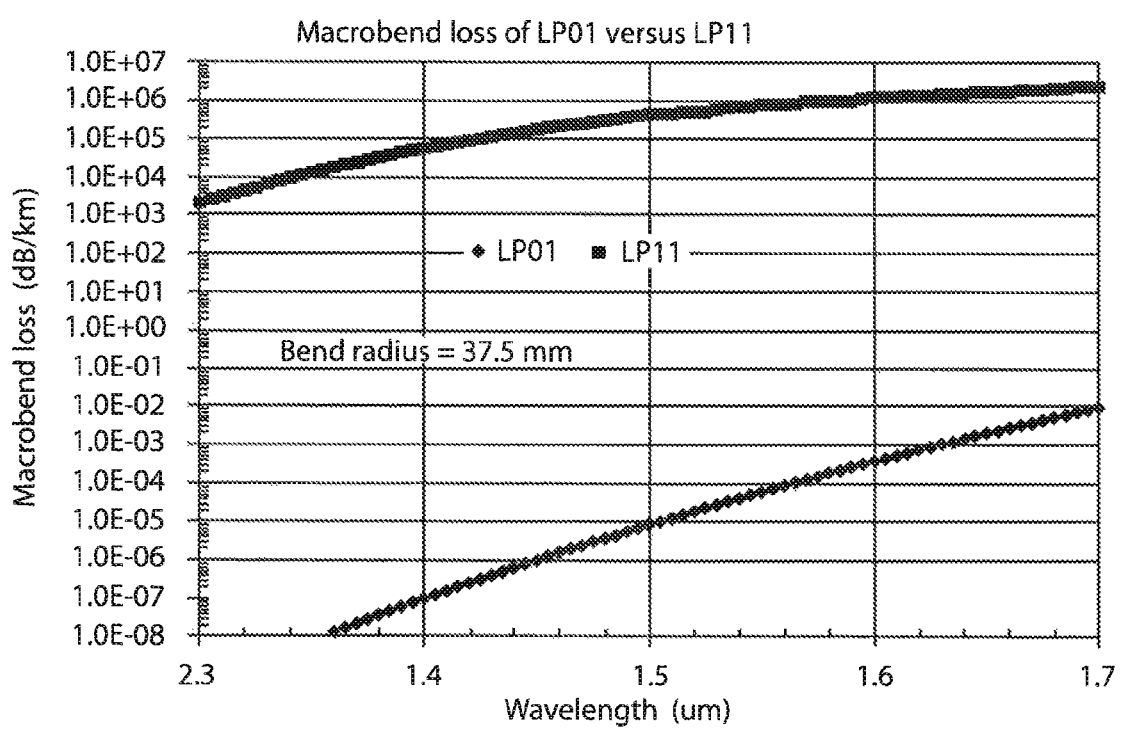
FIG. 4 is a table showing key fiber parameters for one embodiment of a DC Yb-free L-band EDF.
FIG. 5 is a plot showing macro-bending losses.

FIG. 4 is a table showing one embodiment of key parameters of a DC pumped EDF for a Yb-free L-band EDFA. In other words, some key fiber parameters of one embodiment of a DC pumped Yb-free L-band EDF configured with a simple step-index design are shown in FIG. 4. Peak core absorption is at least 10 dB/m, but preferably between 25 dB/m and 50 dB/m at 1530 nm. Commercially available multimode pump diodes have a core with a diameter of approximately 105 μm with a NA of about 0.15 to about 0.22. Therefore, for the embodiment of FIG. 4, the DC pumped Yb free L-band EDF of FIG. 3A is configured to have an inner cladding diameter 304 (FIG. 3A) of about 105 μm in order to achieve high pump efficacy using commercially available low-cost multimode pump diodes.

One key design consideration is to maximize the core diameter while retaining single-mode operation. A relatively large core diameter 305 (FIG. 3A) of about 13 μm to about 19 μm allows for an increased pump absorption ratio, while maintaining single mode operation with a cutoff wavelength of 1520 nm for a low NA of 0.11 (delta n about 0.0041), corresponding to the L-band, which is adequate for telecommunication applications.

For other embodiments, single mode operation is achieved by launching a signal light to preferentially excite only the fundamental mode in the core 301 (FIG. 3A). In embodiments where few-mode operation may occur in an Er-doped core, a larger core diameter with a NA of approximately 0.11 or greater may result in higher order modes. For these embodiments, a launching single mode fiber will be spliced directly into the center of the DC pumped Yb-free L-band EDF. In some embodiments, a core to inner cladding ratio is about 65:1 to about 70:1, resulting in a cladding absorption coefficient of about 0.4 to about 0.5 dB/m. Assuming a 90 percent pump absorption efficiency, cladding absorption coefficients are great enough to construct efficient amplifiers (e.g., gain >25 dB) with a fiber length of about 50 m. In other embodiments a higher core-to-inner-cladding ratio is used. This further increases pump absorption and, thus enables use of an even shorter fiber length. Overall, this design limits potential interference due to four-wave mixing, resulting from decreased fiber length and increased core diameters.

In designing the DC Yb-free L-band EDFA, it is important to consider the impact of bending on the effective cutoff wavelength of the fiber. Bending impacts propagation of higher modes and, thus affects desired single mode propagation. Since the fiber will be wound on a spool, small bends in the fiber will push a cutoff to lower wavelengths, providing more efficient stripping of higher modes than is observed with larger bend diameters.

With this in mind, attention is turned to FIG. 5, which shows macrobending losses in a fundamental and a higher-order mode. Specifically, FIG. 5 plots the LP01 and LP11 macrobending losses at 75 mm bend diameter in a fiber design with 0.0041 delta-n core index and 13.5 um core diameter (FIG. 4). While the LP01 mode has a negligibly small bend loss, the LP11 mode has an extremely high bend loss of 754 dB/meter at 1.55 um at 75 mm bend diameter. Thus, the LP11 mode is stripped off within a few centimeters of the fiber. This permits use of a larger core diameter with an apparent cutoff above 1.55 um. As described earlier, a larger core diameter increases the pump absorption. Such bending may make otherwise few-moded fibers practical. Thus, in some embodiments, the core diameter 305 is further increased to maximize the absorption of a multimode pump light.

Due to the difference in macrobending losses in the LP01 and LP11 modes, illustrated in FIG. 5, one can strip away the LP11 mode by decreasing the spool diameter to increase its bending loss selectively.

Figure 6A:
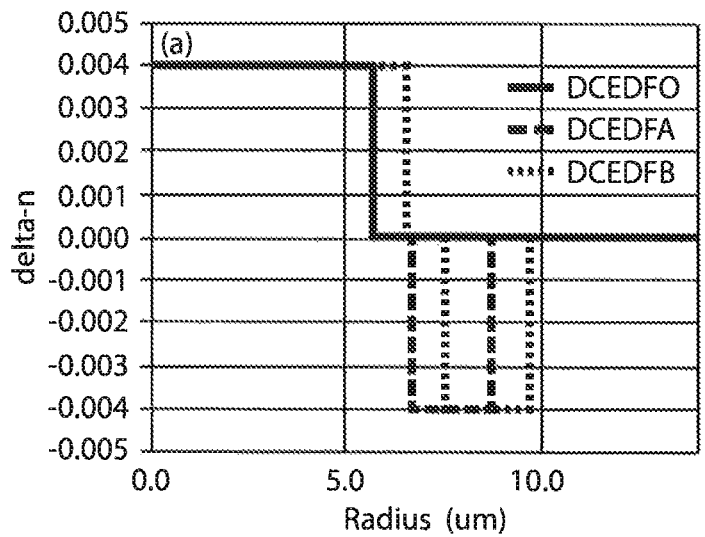
FIG. 6A is a diagram showing several embodiments of refractive index profiles using a trench design.

Additionally, other embodiments implement more complex core designs to achieve increased core area and low NA, while maintaining single-mode operation. These include an addition of low-index trenches and/or high-index rings to suppress higher order modes (FIG. 6A). When a low-index trench is used, the core diameter can be further increased, and the core-to-inner cladding ratio can be about 28:1 to about 30:1, resulting in a cladding absorption coefficient of about 0.7 to about 0.8 dB/m. In embodiments that employ low-index trenches surrounding the core, improved bending performance is achieved, which is important for L-band EDFAs. FIG. 6A is a diagram showing a refractive index profile of a fiber with a core diameter of 11.6 µm with no trench (DCEDF0), a core diameter of 11.6 µm with a trench (DCEDFA), and a fiber core with a core diameter of 13.6 µm with a trench (DCEDFB).

Figure 6B:
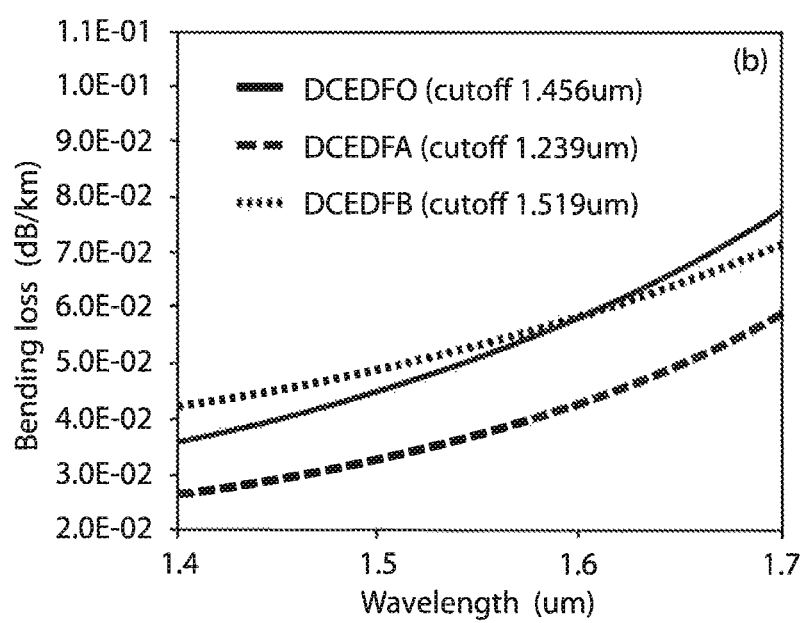
FIG. 6B is a diagram showing simulation results demonstrating the effect of the fiber designs of FIG. 6A on cutoff wavelengths and bending losses of the fiber designs.

FIG. 6B is a diagram showing simulation results demonstrating the effect of fiber designs of FIG. 6A on cutoff wavelengths and bending losses of the three fiber designs As shown in FIG. 6B, the cutoff wavelength for a core diameter of 11.6 µm with no trench is 1.456 µm. When the trench is added to a core with a diameter of 11.6 µm the cutoff wavelength is predicted to decrease to 1.339 µm (FIG. 6B). Importantly, some embodiments utilizing a trench also include an increased core diameter of approximately 13.6 µm, while still maintaining a cutoff wavelength of approximately 1520 nm. In other words, embodiments that contain a trench may have an increased core diameter 205, allowing for improved pump light absorption, while not being affected by significant bend loss, as shown in FIG. 6B.

Signal-Pump Multiplexer

One drawback associated with reducing the inner cladding diameter is that a special pump diode may be required. Specifically, the special pump diode may require a special multimode pigtail fiber matched in diameter to an inner cladding of the DC EDF 205 used. For example, where the inner cladding of the DC EDF 205 is 50 µm, the diameter of the multimode pigtail fiber should also be approximately 50 µm. A multimode pigtail fiber of a commercially available pump diode has an inner cladding diameter of 105 µm, thus decreasing the inner cladding diameter of the EDF to below approximately 105 µm is not economically practical for telecommunication applications. To address these shortcomings, the disclosed embodiments are designed to achieve high pump absorption coefficients, while employing commercially available low-cost pump diodes.

Several embodiments of the high power DC pumped Yb-free EDFA (FIG. 2) comprise an optical signal-pump multiplexer 203, in which the signal and pump light are coupled by an optical multiplexer based on an interferometric filter. For some embodiments the signal-pump multiplexer comprises a standard single mode fiber 202a, 202b (collectively 202) located on a signal port and a passive DC fiber 205a, 205b (collectively 205) located on a common port, which has similar waveguide properties (e.g., core diameter, inner cladding diameter, and outer cladding diameter) as the DC EDF 206 that is spliced to the passive DC fiber 205. The passive DC fiber has a core diameter of about 12 µm to 15 µm. Additionally, the passive DC fiber 205 has a core with a NA of about 0.08 to about 0.10 relative to the inner cladding. In order to capitalize on commercially available low-cost multimode pump diodes, a pump port utilizes a multimode fiber with a core diameter of about 105 µm, an outer cladding diameter of about 125 µm and a NA of a core that is about 0.15 relative to the cladding.

For some embodiments, the passive DC fiber 205 has an inner cladding diameter of 105 µm and an outer cladding diameter of 125 µm. The inner cladding of the passive DC fiber 205 has a NA of at least 0.18 relative to the outer cladding. A low NA of the core of the passive DC fiber 205 maintains single-mode operation of the signal light at L-band wavelengths. Further, the high NA of the inner cladding of the passive DC fiber 205 works to improve the pump light coupling efficiency. Thus, as demonstrated by thin-film techniques, the embodiments described achieve a pump light coupling efficiency as high as about 95 percent.

The Yb-free DC-EDFA may also use other types of signal-pump light multiplexers, such as, for example, a tapered fiber bundle (as shown in FIG. 1), fused couplers, interferometric devices based on thin film technology, etc.

EXAMPLE

The disclosed embodiments are further clarified by the following example, which is intended to be exemplary of the embodiments, as generally depicted in FIG. 2 and FIG. 3.

A total output power of +32 dBm has been achieved by employing a Yb-free DC-EDF fiber based on the design depicted in FIG. 3. In this example, the Yb-free DC-EDF has a core diameter of 17 µm and a NA of 0.11, relative to inner cladding. Further, the inner-cladding has a diameter approximately 125 µm and with a NA of 0.45, relative to the outer-cladding. The core has a peak absorption of approximately 14.5 dB/m, at approximately 1530 nm, and a background loss of less than 5 dB/km at 1550 nm.

Figure 7A:
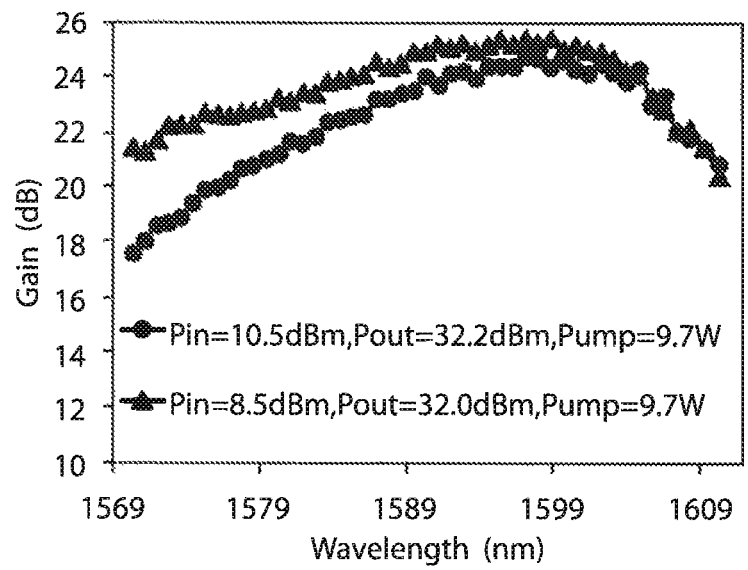
FIG. 7A shows one example of a measured gain of the Yb-free DC-EDFA.

Sixty meters of the Yb-free DC EDF was used in a Yb-free DC EDFA, was bi-directionally pumped as depicted in FIG. 2, and performance characteristics were evaluated. FIG. 7A shows measured gain of the DC EDFA as a function of wavelength from 1570.4 nm to 1610.4 nm. As measured, gain was as high as approximately 25 dB in 40 nm bandwidth at L-band with a gain deviation of less than 5 dB. Output power was +32 dBm using a total 976 nm multimode pump power of 9.7 W.

Figure 7B:
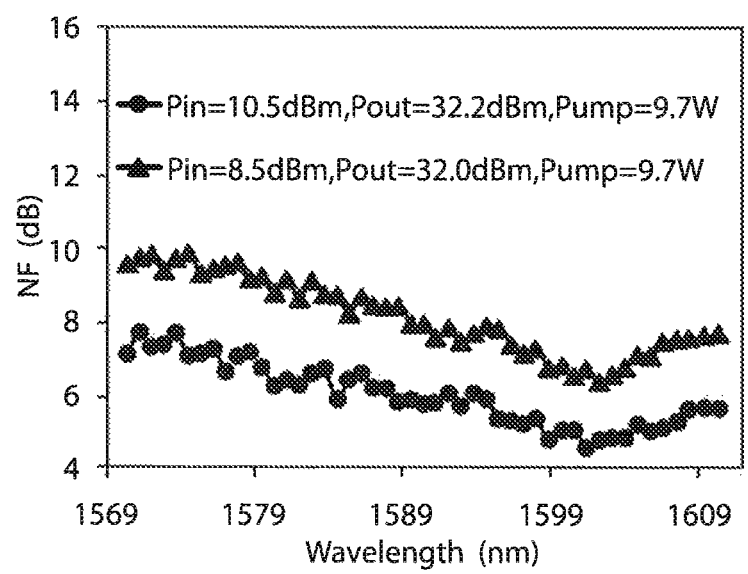
FIG. 7B shows one example of a measured noise figure (NF) of the Yb-free DC-EDFA.

Another important characteristic to consider is the OSNR. FIG. 7B shows a measured noise figure (NF) of the Yb-free DC-EDFA as a function of wavelength. As measured, the tested Yb-free DC-EDFA utilizing 60 m of the DC-EDF of the present example, had a NF in the range of about 4.6 dB to 9.6 dB. A NF within this range is acceptable for booster high power amplifiers for optical fiber transmissions. Further optimization of the DC-EDF and the design of DC-EDFA can further improve the gain flatness and NF of the amplifier system.

Figure 8:
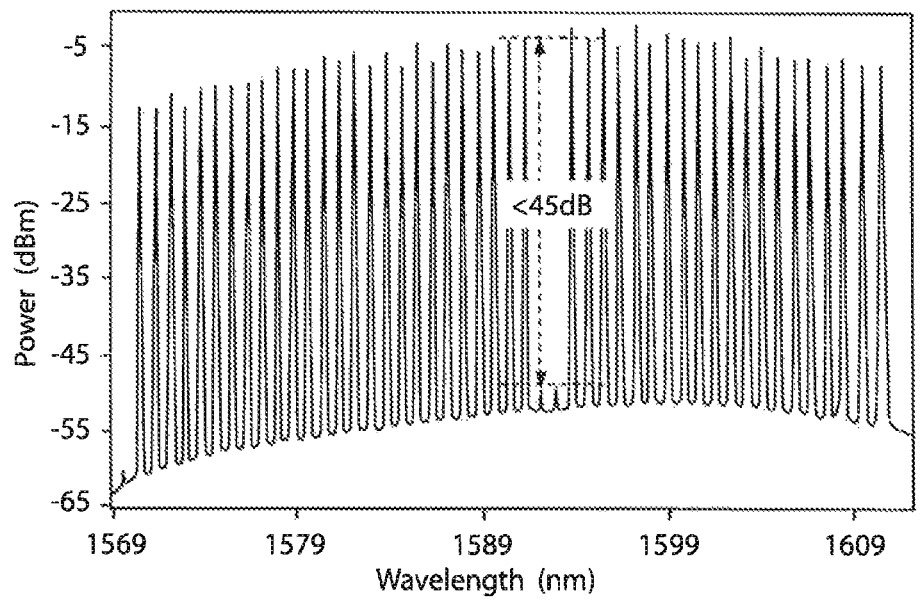
FIG. 8 shows one example of an output spectrum from the Yb-free DC-EDFA.

FIG. 8 shows the output spectrum from DC-EDFA with the output power +32 dBm, and 2 wavelength channels being turned off. Because of the large-core diameter DC-EDF used, FWM components are less than −45 dB at the output power of +32 dBm. At a channel spacing of approximately 100 GHz, Yb-free L-band DC EDFA of the present disclosure has a much lower nonlinearity than conventional L-band EDFAs.

The Yb-free DC-EDF in this example allows two guided signal modes (LP01 and LP11) at a signal band of 1530 to 1615 nm. Only a fundamental mode (LP01) significantly benefits from the available gain when the presently disclosed Yb-free DC-EDF is fusion spliced to a standard single-mode fiber (SSMF) to construct a DC-EDFA as depicted in FIG. 2. Higher-order modes (LP11, in this example) can be stripped out by higher-order mode stripping processes. Here two mode-stripping processes were involved. The first higher order mode stripping process was mode selective coupling between the DC-EDF and SSMF that act at an input and an output of DC-EDF (FIG. 2, 207). Higher-order mode stripping also resulted from an increased gain coefficient of DC-EDF fundamental mode with respect to the higher order modes due to its large confinement into the DC-EDF gain medium.

In the first higher-order mode (HOM) stripping process, an amount of power transferred from the SSMF to the LP mode in the DC-EDF (and vice versa) is determined by an overlap integral ($\psi_{lp}$) between a transverse mode field profile of the fundamental mode in the SMF and a transverse mode field profile of a LP mode in DC-EDF. HOM overlap integral values in the DC-EDF are much smaller than overlap integral values for the fundamental mode (LP01), which matches closely with overlap integral values for the fundamental mode propagated in the SMF. Numerical calculation shows that the overlap integral between the fundamental mode in SSMF and LP01 mode in the disclosed DC-EDF is: $\psi_{01}$~0.99, Meanwhile, the overlap integral between the fundamental mode propagated in the SSMF and LP11 mode in the disclosed DC-EDF is: $\psi_{01}$~0.0, In the second HOM stripping process, the gain coefficient of the disclosed DC-EDF is determined by a called confinement factor "$\Gamma_{lp}$" of a mode in the core of the disclosed DC-EDF. The confinement factor is the ratio of power confined in the doped core to total power that propagates in the mode (LP01 or LP11). Numerical calculation shows that the confinement factor "$\Gamma_{lp}$" is 0.98 (i.e., "$\Gamma_{01}$~0.98) for LP01, and 0.88 (i.e., "$\Gamma_{11}$~0.88) for LP11 in this example.

Combining these two mode stripping processes, the net gain of the LP mode is $$G_{lp} = \psi_{lp} \times e^{\int_0^L \Gamma_{lp} \times g \times dl},$$

where g is the gain per unit length and L is the length of the DC-EDF used in the DC-EDFA. Based on this calculation, the net gain for the LP11 mode in this example will be $-\infty$. Therefore, theoretically, the net gain for a higher-order mode does not exist in the disclosed DC-EDFA based on the configuration in FIG. 2. Practically speaking, even if there is a slight core misalignment created during a splicing process, most of the power from SSMF is coupled into the fundamental mode LP01 of the disclosed DC-EDFA.

Figure 9:
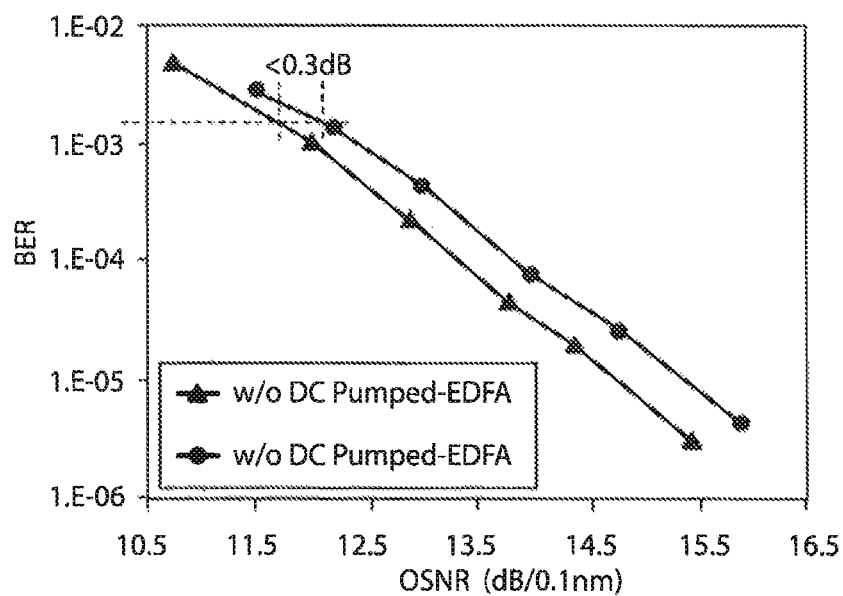
FIG. 9 shows one example of the bit error rate as a function of optical signal-to-noise-ratio (SNR) of the Yb-free DC EDFA.

Additionally, a high speed 100-Gb/s digital transmission experiment was conducted to confirm that there is no impairment due to presence of a higher-order mode in the disclosed Yb-free DC-EDFA. With this in mind, FIG. 9 shows a bit-error-rate (BER) as a function of optical-signal-noise-ratio (OSNR) at 100-Gb/s polarization division multiplexed quadrature phase shift keying (PDM-QPSK) amplified transmission fiber link with and without the disclosed Yb-free DC-EDFA. Overall, the disclosed Yb-free DC-EDFA shows a negligible OSNR penalty (<0.3 dB). This OSNR penalty is within a measurement error range limited by the measurement equipment used in this experiment.

Although exemplary embodiments have been shown and described, it will be apparent to those of ordinary skill in the art that a number of changes, modifications, or alterations to the disclosure as described may be made. Pump light may be introduced from a single pump diode source or multiple diodes, which are configured to provide some level of robustness through redundancy. For example, pumps may be shared among different amplifiers or gain stages. Pumps may also be other laser types, such as Raman lasers or amplifiers with output anywhere within the absorption bandwidth of the gain medium. Additionally, while a tapered fiber bundle is shown as a preferred embodiment of a multiplexer, it should be appreciated that any multiplexer may be used to couple signal light into the core of the gain fiber and pump light into at least the inner cladding of the gain fiber. For example, in addition to fused couplers, the signal light and pump light may be combined using free-space devices based on micro-optics, side-coupling methods, and other known methods in the art. All such changes, modifications, and alterations should therefore be viewed as within the scope of the disclosure.

What is claimed is:

1. An optical amplifier, comprising:
   a double-cladding-pumped (DC) Erbium-doped fiber (EDF), the DC-EDF being substantially free of Ytterbium (Yb), the DC-EDF comprising a core, the DC-EDF further comprising a trench located radially exterior to the core;
   a signal-pump multiplexer optically coupled to the DC-EDF, the signal-pump multiplexer comprising:
   a single-mode fiber (SMF); and
   a double-clad (DC) passive fiber, comprising:
      a passive core optically coupled to the SMF, the passive core having a matching core mode-field diameter, the matching core mode-field diameter being substantially equal to a core mode-field diameter of the DC-EDF; and
      an inner cladding having a matching inner-cladding diameter, the matching inner-cladding diameter being substantially equal to an inner cladding diameter of the DC-EDF;
   a signal source to generate a signal, the signal source being optically coupled to the signal-pump multiplexer; the signal-pump multiplexer for coupling the signal to the DC-EDF; and
   a pump source for pump light, the pump source being optically coupled to the signal-pump multiplexer, the signal-pump multiplexer further for coupling the pump light to the DC-EDF.

2. The optical amplifier of claim 1, the pump source being optically coupled to the DC-EDF in a co-propagation configuration.

3. The optical amplifier of claim 2, further comprising:
   a second pump source optically coupled to the DC-EDF in a counter-propagation configuration.

4. The optical amplifier of claim 1, the pump source being optically coupled to the DC-EDF in a counter-propagation configuration.

5. The optical amplifier of claim 1, further comprising an output saturated power of at least about 27 dBm.

6. The optical amplifier of claim 1, further comprising a spool, the DC-EDF being wound on the spool.

7. The optical amplifier of claim 1, the DC-EDF comprising:
   an Erbium-doped core, the Erbium-doped core having a core diameter between approximately 13 μm to approximately 19 μm;
   an inner cladding located radially exterior to the core, the inner cladding having an inner-cladding diameter between approximately 90 μm and 125 μm, the core further having a numerical aperture between approximately 0.09 and approximately 0.15 relative to the inner cladding; and
   an outer cladding located radially exterior to the inner cladding, the inner cladding further having a numerical aperture between approximately 0.18 and approximately 0.65 relative to the outer cladding.

8. The optical amplifier of claim 1, the signal source to further generate a signal at a signal wavelength between approximately 1568 nm and approximately 1610 nm.

9. The optical amplifier of claim 1, the pump source providing a pump light having a wavelength of approximately 980 nm the pump source is uncooled multimode light.

10. An optical fiber, comprising:
- a core comprising a rare-earth dopant, the core having a core diameter between approximately 13 μm to approximately 19 μm;
- an inner cladding located radially exterior to the core, the inner cladding having an inner-cladding diameter between approximately 90 μm and 125 μm, the core further having a numerical aperture between approximately 0.09 and approximately 0.15 relative to the inner cladding; and
- an outer cladding located radially exterior to the inner cladding, the inner cladding further having a numerical aperture between approximately 0.18 and approximately 0.65 relative to the outer cladding.

11. The optical fiber of claim 10, the core being doped with Erbium (Er) to have a peak absorption between approximately 15 dB/m and approximately 45 dB/m, the core further being co-doped with Aluminum (Al).

12. The optical fiber of claim 10, further permitting propagation of only the fundamental mode throughout the device length in a typical compact spool diameter.

13. The optical fiber of claim 10, further comprising index features to permit low macrobending loss at the fundamental mode and a high bend loss at the higher order modes.

* * * * *